March 3, 1931.    C. H. COBB    1,795,163
DISTANCE BOLT FOR RADIATOR HANGERS
Filed Sept. 13, 1927
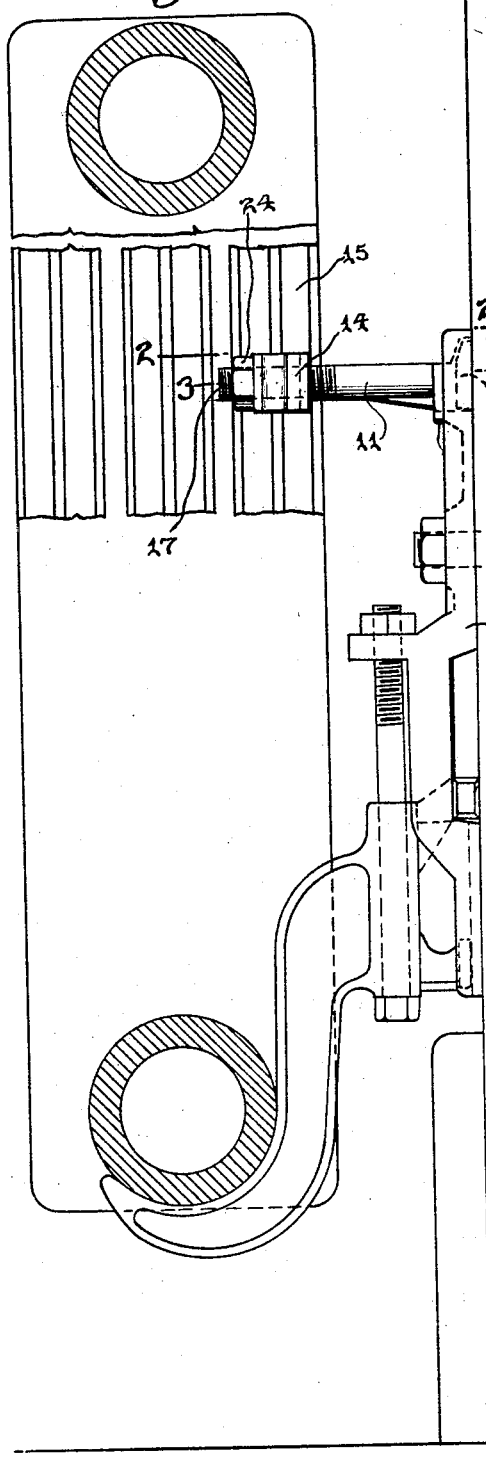
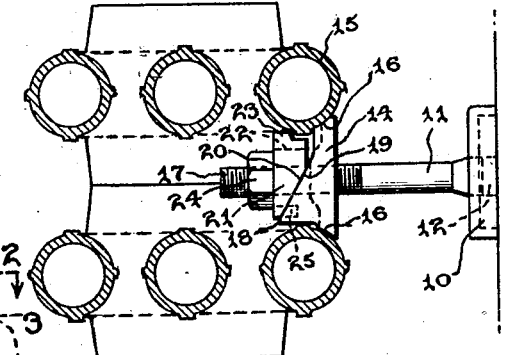
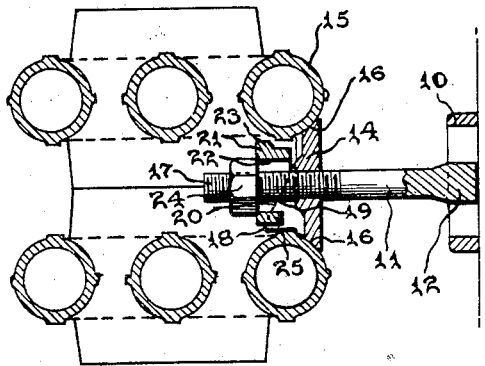
INVENTOR.
C. H. Cobb
BY
ATTORNEY Patented Mar. 3, 1931

1,795,163

UNITED STATES PATENT OFFICE

CHARLES H. COBB, OF SAN FRANCISCO, CALIFORNIA

DISTANCE BOLT FOR RADIATOR HANGERS

Application filed September 13, 1927. Serial No. 219,352.

The object of the invention is to improve the distance bolt for radiator hangers such as those shown in Patents Numbers 1,527,120 and 1,634,981, to particularly adapt the distance bolt for use in connection with the prevailing new form of radiator; to provide a distance bolt in which the radiator clamping or engaging means may be readily and quickly adjusted for the proper spacing of the radiator from the wall and the subsequent effective clamping despite imperfections in molding occurring in this class of goods; and to provide clamping elements which are of simple form and therefore susceptible of cheap manufacturing cost.

With this object in view, the invention consists in a construction and combination of parts of which a preferred embodiment is illustrated in the accompanying drawings, wherein:

Figure 1 is a side elevational view of a radiator hanger embodying the improved construction.

Figures 2 and 3 are respectively sectional views on the planes indicated by the lines 2—2 and 3—3 of Figure 1.

The hanger 10 is like that illustrated in Patents Numbers 1,527,120 and 1,634,981, the distance bolt 11 being connected with the hanger by a foot 12 in a manner identical with that shown in the latter patent.

The distance nut 14 is rectangular in shape, the length exceeding slightly the distance between the tubes 15 of the radiator to be hung and the width being less than the distance between adjacent tubes, so that in one position of the distance nut it may pass between the tubes to position it adjacent the intermediate or outer rows of tubes if desired to do so. In the illustrated embodiment it is shown positoned behind the innermost row of tubes and the end edges are beveled as indicated at 16 to provide tube seats, the distance nut being provided at its longitudinal center with a tapped hole to effect threaded engagement with the bolt 11 which at the outer end is provided with threads 17. Rotating the distance nut on the bolt will effect its movement axially of the bolt to secure its proper position on the latter.

On the outer face, the distance nut is provided with spaced wings 18 the edges 19 of which are formed at an inclination to the face of the bolt to provide inclined planes against which the inclined face 20 of the follower 21 engages, the latter being formed with a hole 22 larger than and through which the bolt 11 passes. The follower 21 is provided with a lateral lug 23 engaging one of the radiator tubes when the nut 24 is attached to the distance bolt and screwed home, the nut bearing upon the follower and the latter thereby being moved into clamping engagement with the radiator tubes and by reason of the inclined co-operating faces 19 and 20 move laterally toward the tube as well as toward the distance nut. To prevent angular or turning movement between the follower and the distance nut, the former is provided with a lug 25 disposed between the wings 18.

By reason of the construction of the distance nut and follower, there is relative lateral movement between the two in the clamping operation as well as movement of the two towards each other, so that a firm gripping action on adjacent radiator tubes is effected.

The invention having been described, what is claimed as new and useful is:

1. A device for the purpose indicated comprising a bracket-carried member, a distance element adjustable axially of said member and provided with seats for the tubes of a radiator, a follower mounted on said member, and means for effecting movement of the follower toward the distance element, the latter and the follower having co-operating means for effecting relative lateral movement.

2. A device for the purpose indicated comprising a bracket-carried member, a distance element adjustable axially of said member and provided with seats for the tubes of a radiator, a follower mounted on said member, and means for effecting movement of the follower toward the distance element, the latter and the follower having co-operating means for effecting relative lateral movement, and the two being interlocked to preclude relative angular or turning movement.

3. A device for the purpose indicated comprising a bracket-carried bolt, a distance nut threadingly engaged with said bolt to permit adjustment axially of the latter, a follower mounted on said bolt and having a hole larger than and through which the bolt extends, and a nut engaged with the bolt and bearing upon the follower, the distance nut and follower being interlocked to preclude angular or turning movement and having co-operating means to effect relative lateral movement.

4. A device for the purpose indicated comprising a bracket-carried member, a distance element axially adjustable of the same and provided with a wing having an inclined surface, a follower mounted on the bracket-carried member and having an inclined face engaged with the inclined surface of the wing, and a clamping member carried by said member, and engaging said follower to effect its movement toward the latter, said engaging inclined faces effecting relative lateral movement between the follower and distance element.

5. A device for the purpose indicated comprising a bracket-carried bolt, a distance nut threadingly engaged with the same and provided with spaced wings having inclined edges, a follower having a hole larger than and through which said bolt extends and an inclined face bearing on the inclined edges of said wings, the follower having a lug disposed between said wings, and a nut threadingly engaging the bolt and bearing upon the follower.

In testimony whereof, he affixes his signature.

CHARLES H. COBB.